(12) United States Patent
Reinecker

(10) Patent No.: US 10,961,775 B2
(45) Date of Patent: Mar. 30, 2021

(54) VENETIAN AND ROLLER BLIND DRIVE WITH DAMPING

(71) Applicant: Bühler Motor GmbH, Nuremberg (DE)

(72) Inventor: Bernd Reinecker, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 307 days.

(21) Appl. No.: 16/130,296

(22) Filed: Sep. 13, 2018

(65) Prior Publication Data

US 2019/0085631 A1    Mar. 21, 2019

(30) Foreign Application Priority Data

Sep. 20, 2017 (DE) ..................... 10 2017 216 646.0

(51) Int. Cl.
| | |
|---|---|
| *E06B 9/72* | (2006.01) |
| *H02K 5/24* | (2006.01) |
| *E06B 9/70* | (2006.01) |
| *E06B 9/322* | (2006.01) |
| *E06B 9/42* | (2006.01) |

(52) U.S. Cl.
CPC ............. *E06B 9/72* (2013.01); *E06B 9/322* (2013.01); *E06B 9/42* (2013.01); *E06B 9/70* (2013.01); *H02K 5/24* (2013.01); *E06B 2009/725* (2013.01); *H02K 2207/03* (2013.01)

(58) Field of Classification Search
CPC ... E06B 9/72; E06B 9/322; E06B 9/42; E06B 9/70; E06B 2009/725; H02K 2207/03
See application file for complete search history.

(56) References Cited

U.S. PATENT DOCUMENTS

| | | | | |
|---|---|---|---|---|
| 9,209,660 | B2* | 12/2015 | Dettenberger | .......... F16D 65/18 |
| 9,413,204 | B2* | 8/2016 | Ota | .......... F04C 23/008 |
| 2010/0175838 | A1* | 7/2010 | Faller | .......... H02K 5/24 |
| | | | | 160/310 |
| 2011/0265958 | A1 | 11/2011 | Skinner et al. | |
| 2016/0017656 | A1* | 1/2016 | Adreon | .......... E06B 9/68 |
| | | | | 160/7 |

FOREIGN PATENT DOCUMENTS

| | | |
|---|---|---|
| AT | 000810 U1 | 5/1996 |
| DE | 196 13 041 A1 | 10/1997 |
| EP | 2 922 183 A1 | 9/2015 |
| WO | 2014/152427 A1 | 9/2014 |

OTHER PUBLICATIONS

Search Report dated May 15, 2018, issued in counterpart German Patent Application No. 10 2017 216 646.0 (6 pages).

* cited by examiner

*Primary Examiner* — Beth A Stephan
(74) *Attorney, Agent, or Firm* — Westerman, Hattori, Daniels & Adrian, LLP

(57) ABSTRACT

A venetian blind drive, with a geared motor, consisting of an electric motor and a reduction gear unit, a drive housing, a motor mount for the geared motor, a damping device arranged between the motor mount and the geared motor, and a damping mechanism for the damping means on the geared motor. A generic drive that can be produced and mounted in an easy and economical manner, has a low number of parts, and has reliable structure-borne sound insulation.

14 Claims, 4 Drawing Sheets

VENETIAN AND ROLLER BLIND DRIVE WITH DAMPING

CROSS-REFERENCE TO RELATED APPLICATIONS

The present patent application is based on, and claims priority from, German Application No. DE 10 2017 216 646.0, filed Sep. 20, 2017, which is incorporated herein by reference in their entireties.

BACKGROUND OF THE INVENTION

(1) Field of the Invention

The invention relates to a roller or venetian blind drive, with a geared motor, consisting of an electric motor and a reduction gear unit, and a drive housing.

(2) Description of the Related Art Including Information Disclosed Under 37 CFR 1.97 and 1.98

Prior art drives are, for example, used as roller blind or venetian blind drives, wherein the drive housing is part of a winding device. The electric motors used in such drives are often provided with grooved rotors or stators, which bring about a detent torque. This detent torque serves as brake torque when the motor is at a standstill. During operation, undesired vibrations are, however, produced thereby. In order to not transfer these vibrations to the drive housing, which constitutes a resonating body, or to only transfer them to a minor extent, damping means in the form of rubber or rubber-like inserts are arranged between the geared motor and the drive housing. As a result, direct contact between the geared motor and the drive housing does not exist.

Known already are prior art drives that have damping means between a geared motor and a drive housing, wherein the damping means are, for example, mounted on an annular projection of the geared motor and are received in the drive housing in a counter form. In this case, additional anti-rotation geometries are provided on the damping means, the geared motor, and the drive housing. This arrangement prevents the geared motor from rotating about its own axis with respect to the drive housing. For this reason, complex injection molding tools are required, which make the production of the drive more expensive.

BRIEF SUMMARY OF THE INVENTION

The invention relates to a roller or venetian blind drive, with a geared motor, consisting of an electric motor and a reduction gear unit, a drive housing, a motor seat for mounting the geared motor, a damping device arranged between the motor seat and the geared motor, and a damping mount for the damping device on the geared motor.

The aim of the present invention is therefore to ensure a generic drive that can be produced and mounted in an easy and economical manner, have as low a number of parts as possible, and having reliable structure-borne sound insulation.

It is provided that a form fit exists between the motor seat (also known as a motor mount) and the damping mount. This form fit exists even if the damping device is not installed. The damping device can still be formed easily and without form-fit contours, and be adapted to the form-fit contour of the motor mount and the damping device mount.

First and foremost, the form fit is formed in a direction of rotation about a motor axis, so that the geared motor is secured against rotation in the drive housing. The form fit is, moreover, also formed in the radial direction to the motor axis, so that the geared motor is securely held in the drive housing. The form fit is, additionally, also formed in the motor axis direction, so that the geared motor is thus held in a form-fit manner in the drive housing in all degrees of freedom.

In a particularly advantageous development of the invention, it is provided that the damping device produces an elastic and damping connection between the motor seat and the damping mechanism mount. As a result of the elasticity of the damping mechanism, the damping mechanism can be adapted to the form-fit contours of the motor seat and the damping mechanism mount and thereby transfer from the geared motor to the drive housing, in particular, forces developing in the direction of rotation, without the damping device itself having to ensure the actual form fit or having to have such a form fit.

It is provided that the damping device be annular in its basic shape, but that it not be circularly arranged in the mounted state. As a result, a particularly simple geometry, and thus a particularly easy producibility, is afforded.

It is particularly advantageous if the cross-section of the damping device stays constant over its circumference. As a result, the damping ring could, in principle, be moved and rotated along its circumference without neutralizing the form-fit effect between the geared motor and the motor seat.

So that the damping element can be inserted into the motor seat in an axially form-fit manner, the cross-section of the damping device has an annular groove on its outer contour.

Expediently, the damping device is held in a form-fit manner on the geared motor, in particular, the damping device seat, both in an axially-parallel direction and in a direction radial to the motor axis. As a result, the damping device can be mounted on the geared motor, and is thereby pre-mounted in a loss-proof manner. In this way, the geared motor and the drive housing can be produced at different locations and be combined later to produce the drive.

The form fit in the axially-parallel direction preferably consists of a radial annular extension of the damping means seat. The elastic damping device can be stretched easily and inserted into the damping means seat via this annular extension.

The geared motor is cylindrical in its basic shape and, due to its outer contour, could not produce a form fit with the drive housing. It is therefore provided that the motor seat in the drive housing and the damping means seat of the geared motor be elliptical, oval, or the like and, in any case, not rotation-symmetrical. In this way, a form-fit contour is afforded. Between the motor seat and the damping means seat, a reception space for the damping means is left open, which space is dimensioned such that a form fit would form even without the damping means, and the damping means mainly serve to dampen vibrations of the geared motor. The damping means has no actual form-fit contour, but transfers only the torques that, during operation, act on the housing of the geared motor via the non-round shape of the damping means seat on the similarly-shaped motor seat, and thus on the drive housing. The damping means is in this case substantially compressed in the radial direction and hardly loaded in the circumferential direction.

It is furthermore provided for the drive housing to be two-part, wherein a first housing half has a first portion and a second housing half that has a second portion of the motor seat. Within one housing half, the respective partial motor seat is approximately U-shaped, and the mounting of the geared motor is particularly easy as a result, because the motor seat is shaped like an insertion unit.

In the case of roller blind drives, planetary gear trains are particularly often used as reduction gear units, because they have a cylindrical outer contour like the electric motor. They can therefore easily be integrated or installed in a tube-shaped drive housing in one unit as a geared motor. In this respect, it is recommended that the planetary gear train have a ring gear that is formed integrally with the damping means seat from a plastic material. The number of parts and the assembly effort can be reduced thereby.

The aforementioned form fit of the damping means in the damping means seat is formed in the axially-parallel direction by a ring-disk-like end region, extending radially inwards, of the ring gear.

BRIEF DESCRIPTION OF THE SEVERAL VIEWS OF THE DRAWINGS

An exemplary embodiment of the invention is explained in more detail below with reference to the drawing. The following are shown.

DETAILED DESCRIPTION OF THE INVENTION

Figure 1:
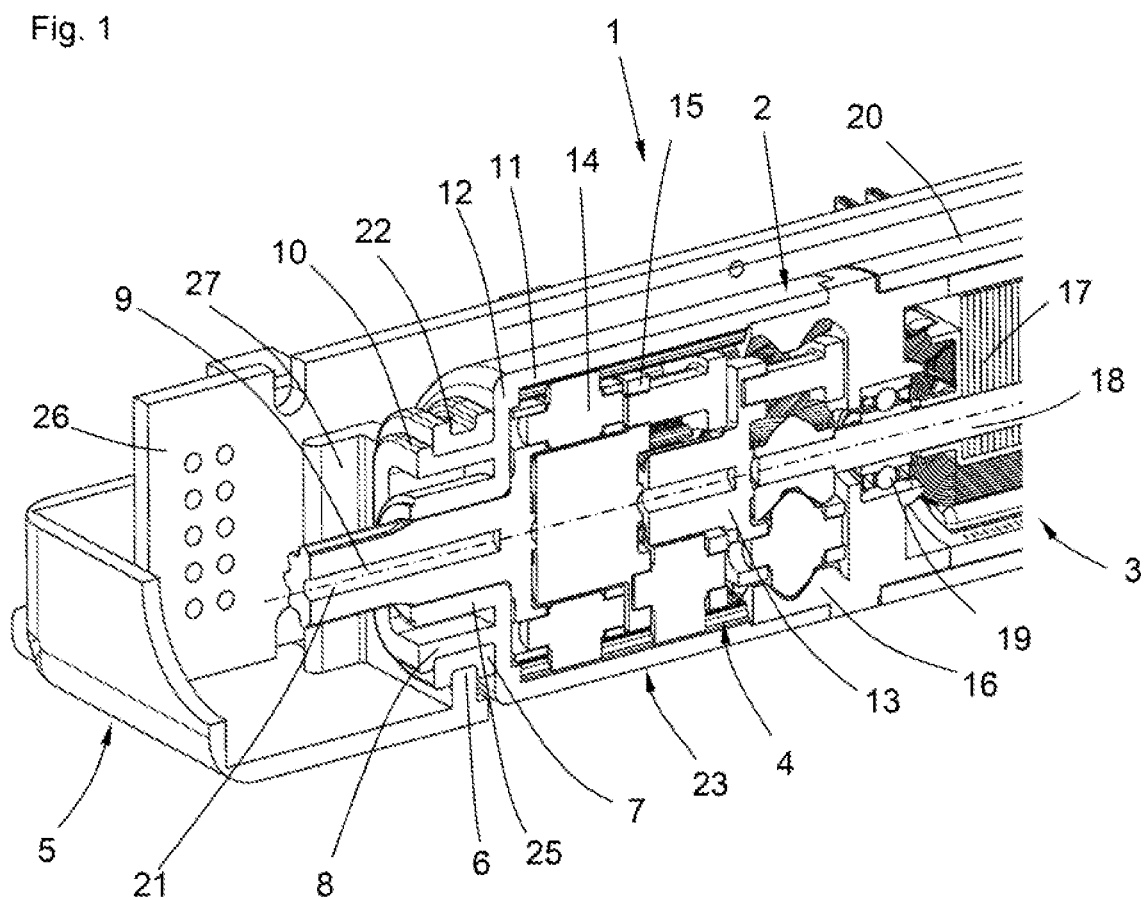
FIG. 1 is a sectional view through the inventive drive.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 4:
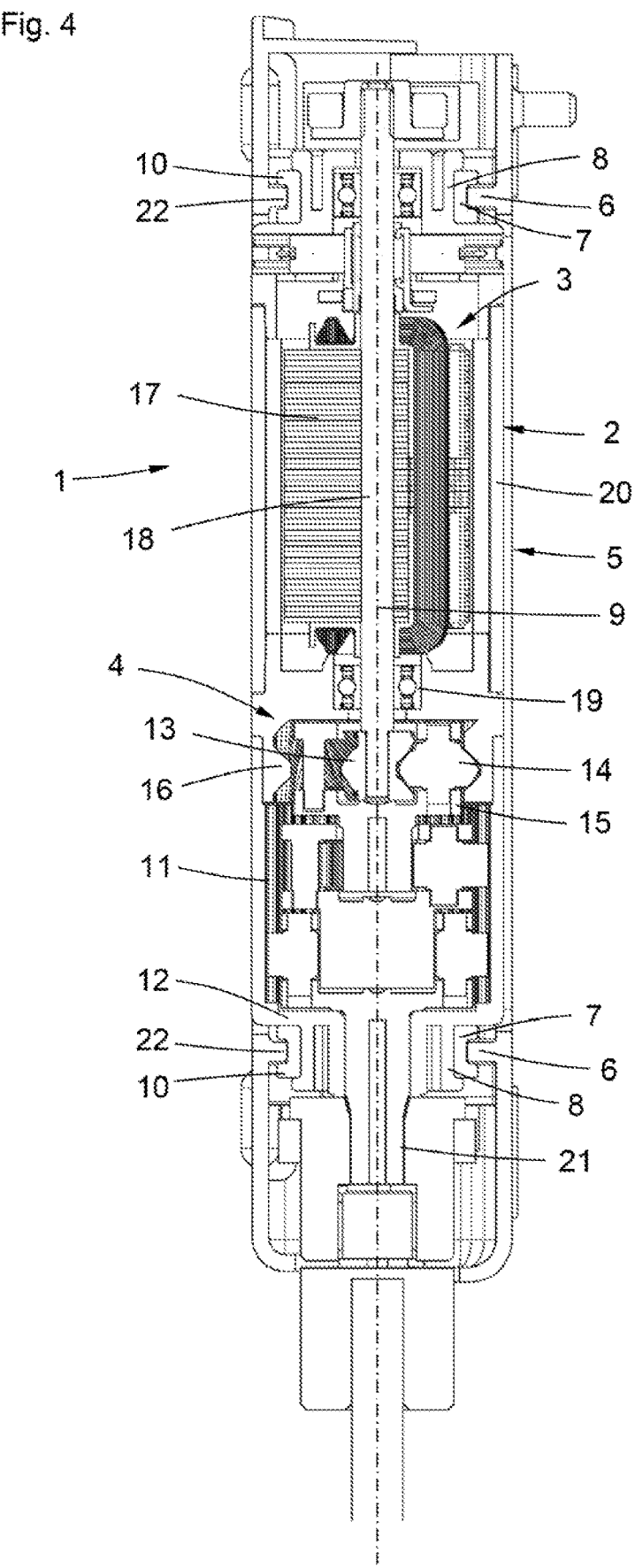
FIG. 4 is a longitudinal sectional view through the inventive drive.

FIG. 1 shows a sectional view through an inventive drive 1 consisting of a geared motor 2 and a drive housing 5. The drive housing 5 has a motor seat or motor mount 6 which is formed in the form of an intermediate wall and has an oval recess. Only a first half of the drive housing 5 is illustrated in FIG. 1. The full drive housing is shown in FIG. 4. The geared motor is composed of an electric motor 3 and a reduction gear unit 4. The electric motor is in this case a commutator motor with a grooved rotor layer assembly 17 about a motor shaft 18. The shaft rotates about bearing 19 (the bearing shield is not shown), and is surrounded by a motor housing 20. The motor housing 20 extends axially beyond the motor and there serves as gear seat. The reduction gear unit 4 is in this case designed in the form of a planetary gear train, which has a sun gear 13, planetary carriers 14, planet gears 15, a first ring gear 16, a second ring gear 11, a damping device seat 8, and an output shaft 21. The damping device seat 8 consists of an oval projection forming a single part with the second ring gear 11, and is delimited by an end region 12, extending radially inwards, of the ring gear 11 and a radial extension 10, whereby a form fit in the axial direction is afforded, which form fit also serves as a loss prevention device or transport safety device for the damping device 7. On its outer contour, the damping device 7 itself has a circumferential annular groove 22, with the help of which the damping device 7 can be inserted into the motor seat in an axially form-fit manner. Also illustrated are a circuit board 26 and a stiff reinforcement 27.

Figure 2:
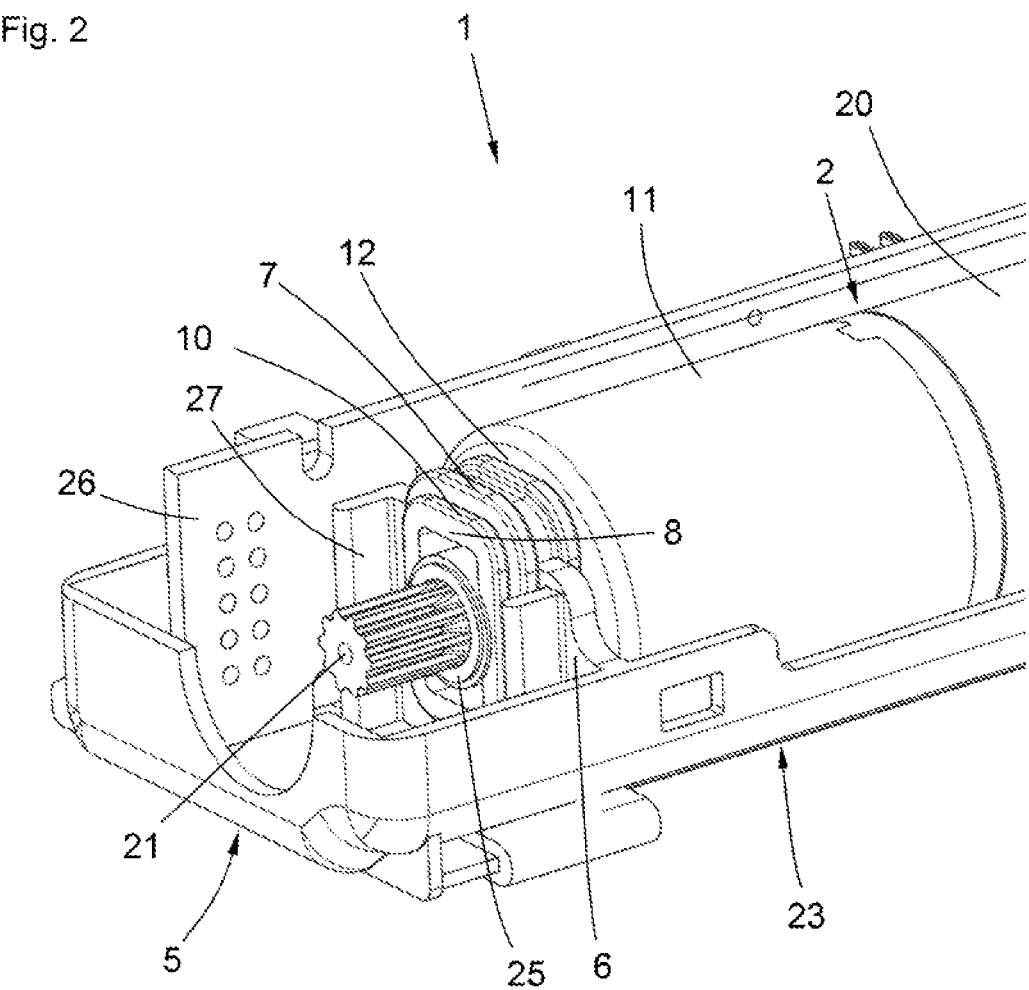
FIG. 2 is a spatial partial illustration of the inventive drive.

FIG. 2 shows a spatial partial illustration of the blind drive 1, with the geared motor 2, the drive housing 5, the motor seat 6, the damping device seat 8, the damping device 7, the motor housing 20, the output shaft 21, the circuit board 26, the reinforcement 27, the extension 10, and the end region 12 of the ring gear 11. A similarly-structured motor seat 6 is provided at both ends of the geared motor. It is, in principle, enough if one of the two motor seats is equipped with an anti-rotation element.

Figure 3:
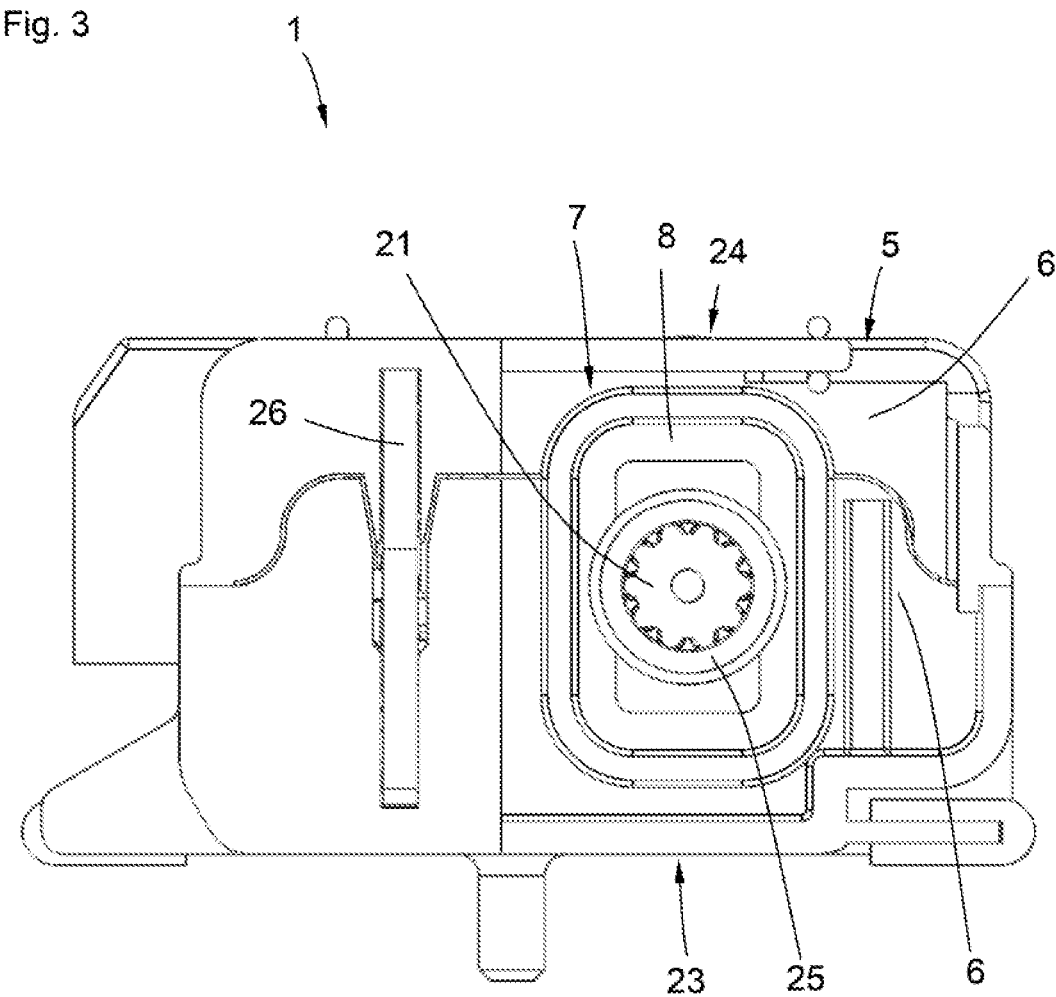
FIG. 3 is a sectional view through a motor seat of the inventive drive.

FIG. 3 shows a sectional view through the inventive drive 1, with the drive housing 5, the motor seat 6, which is formed, on the one hand, in a housing bottom 23 and, on the other, in a housing top 24, the damping device 7, the damping device seat 8, an output shaft 21, the output shaft bearing 25, and the circuit board 26.

FIG. 4 shows a sectional view through the motor seat 6 of a variant of drive 1, with a geared motor 2, consisting of an electric motor 3 and a reduction gear unit 4, a drive housing 5, a motor seat 6, a damping device 7, a damping device seat 8, a motor axis of an extension 10, a first ring gear 16, a second ring gear 11, a sun gear 13, a planetary carrier 15, a planetary gear 14, a rotor blade assembly 17, a motor shaft 18, a bearing 19, a motor housing, an output shaft 21, and an annular groove 22.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Drive
2 Geared motor
3 Electric motor
4 Reduction gear unit
5 Drive housing
6 Motor seat
7 Damping device
8 Damping device seat
9 Motor axis
10 Extension
11 Second ring gear
12 End region
13 Sun gear
14 Planetary gear
15 Planetary carrier
16 First ring gear
17 Rotor layer assembly
18 Motor shaft
19 Bearing
20 Motor housing
21 Output shaft
22 Annular groove
23 Housing bottom
24 Housing top
25 Output shaft bearing
26 Circuit board
27 Reinforcement

What is claimed is:

1. A blind drive comprising:
   a geared motor made up of an electric motor and a reduction gear unit;
   a drive housing;
   a motor seat for receiving the geared motor;
   a damping device arranged between the motor seat and the geared motor; and
   a damping device seat in an axially-parallel direction for receiving the damping device on the geared motor so that there is a form fit between the motor seat and the damping device seat wherein the form fit in the axially-parallel direction is formed by a ring-disk-shaped end region, extending radially inwards, of a ring gear and that the damping device seat is made of an oval shoulder formed in one piece with the ring gear and is in the axial direction a radially inwardly extending end portion of the ring gear and a radial extension, whereby a form fit is provided in the axial direction between the end region and the extension.

2. The blind drive according to claim 1, further comprising a motor axis defined in the electric motor, wherein the form fit is formed in a direction of rotation about the motor axis.

3. The blind drive according to claim 1, wherein the form fit is formed to be radial to the motor axis.

4. The blind drive according to claim 1, wherein the form fit is formed in the direction of the motor axis.

5. The blind drive according to claim 1, wherein the damping device produces an elastic and damping connection between the motor seat and the damping device seat.

6. The blind drive according to claim 1, wherein the damping device is annular in its relaxed shape and not circular when mounted on the damping device seat.

7. The blind drive according to claim 6, wherein the cross-section of the damping device stays constant over its circumference.

8. The blind drive according to claim 6, wherein the cross-section of the damping device has an annular groove on its outer contour.

9. The blind drive according to claim 2, wherein the damping device is held in a form fit on the damping device seat both in an axially-parallel direction and in a direction radial to the motor axis.

10. The blind drive according to claim 9, wherein the form fit in the axially-parallel direction consists of a radial, annular extension of the damping device seat.

11. The blind drive according to claim 1, wherein the shape of the geared motor is cylindrical.

12. The blind drive according to claim 1, wherein the motor seat and the damping device seat are elliptical or oval, and are not rotation-symmetrical.

13. The drive according to claim 1, wherein the drive housing is two-part, wherein a first housing half has a first portion and the second housing half has a second portion of the motor seat.

14. The drive according to claim 1, wherein the reduction gear unit has a planetary gear train with a ring gear, which is integrally formed with the damping device seat from a plastic material.

* * * * *